United States Patent
Izuchi et al.

(10) Patent No.: US 11,251,680 B2
(45) Date of Patent: Feb. 15, 2022

(54) DECELERATION DEVICE

(71) Applicant: SHIROKI CORPORATION, Fujisawa (JP)

(72) Inventors: Kohei Izuchi, Kanagawa (JP); Masao Noguchi, Hekinan (JP); Toshiaki Nagata, Aichi-ken (JP)

(73) Assignee: SHIROKI CORPORATION, Fujisawa (JP)

( * ) Notice: Subject to any disclaimer, the term of this patent is extended or adjusted under 35 U.S.C. 154(b) by 159 days.

(21) Appl. No.: 16/461,659

(22) PCT Filed: Oct. 30, 2017

(86) PCT No.: PCT/JP2017/039195
§ 371 (c)(1),
(2) Date: May 16, 2019

(87) PCT Pub. No.: WO2018/092575
PCT Pub. Date: May 24, 2018

(65) Prior Publication Data
US 2019/0356196 A1 Nov. 21, 2019

(30) Foreign Application Priority Data

Nov. 17, 2016 (JP) .............................. JP2016-224524

(51) Int. Cl.
*F16H 1/16* (2006.01)
*F16H 1/20* (2006.01)
(Continued)

(52) U.S. Cl.
CPC ........... *H02K 7/116* (2013.01); *B60N 2/2231* (2013.01); *F16H 1/16* (2013.01); *F16H 37/041* (2013.01);
(Continued)

(58) Field of Classification Search
CPC .. B60N 2/2252; B60N 2/0232; B60N 2/2231; F16H 1/16
See application file for complete search history.

(56) References Cited

U.S. PATENT DOCUMENTS 6,283,886 B1 * 9/2001 Schumann ............. B60N 2/933
475/162
7,235,030 B2 * 6/2007 Becker ................... B60N 2/225
297/362
(Continued)

FOREIGN PATENT DOCUMENTS

JP S63120944 U 8/1988
JP 2006020782 A 1/2006
(Continued)

OTHER PUBLICATIONS

International Search Report (PCT/ISA/210) dated Jan. 30, 2018, by the Japanese Patent Office as the International Searching Authority for International Application No. PCT/JP2017/039195.
(Continued)

*Primary Examiner* — Jake Cook
(74) *Attorney, Agent, or Firm* — Buchanan Ingersoll & Rooney PC

(57) ABSTRACT

A deceleration device according to an embodiment includes a driven gear configured to rotate about a rotational axis by driving power of a drive mechanism; a deceleration unit including a plurality of gears including a first gear and a second gear, the first gear that rotates by the driven gear, the second gear that rotates about the rotational axis, the deceleration unit configured to rotate the second gear at a reduced speed with respect to the driven gear; a first contact included in the second gear; and a second contact provided separately from the driven gear and the plurality of gears and configured to come into contact with the first contact to stop the rotation of the second gear.

10 Claims, 20 Drawing Sheets

(51) Int. Cl.
  *H02K 7/116* (2006.01)
  *B60N 2/22* (2006.01)
  *F16H 37/04* (2006.01)
  *B60N 2/02* (2006.01)
(52) U.S. Cl.
  CPC .......... *H02K 7/1166* (2013.01); *B60N 2/0232* (2013.01)

(56) References Cited

U.S. PATENT DOCUMENTS

| | | |
|---|---|---|
| 9,499,071 B2 * | 11/2016 | Karthaus .............. B60N 2/1655 |
| 2006/0006717 A1 | 1/2006 | Sakamoto |
| 2010/0244530 A1 * | 9/2010 | Kitano ................. B60N 2/2252 297/362 |

FOREIGN PATENT DOCUMENTS

| JP | 2009045082 A | 3/2009 |
|---|---|---|
| JP | 2012062016 A | 3/2012 |

OTHER PUBLICATIONS

Written Opinion (PCT/ISA/237) dated Jan. 30, 2018, by the Japanese Patent Office as the International Searching Authority for International Application No. PCT/JP2017/039195.

* cited by examiner

FIG.10
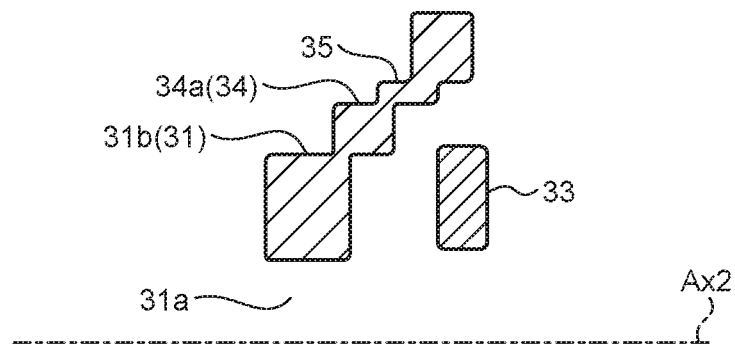
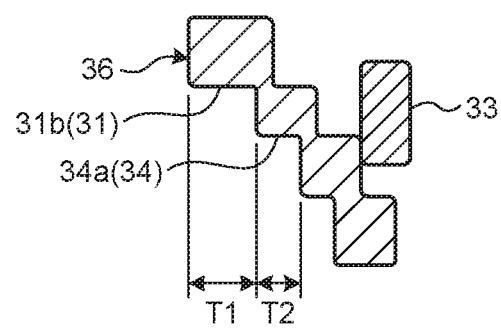
FIG.11
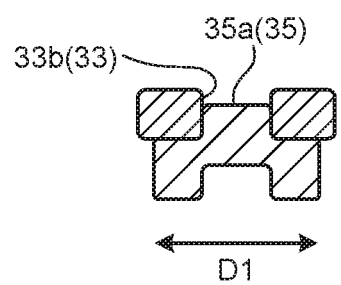

DECELERATION DEVICE

CROSS-REFERENCE TO RELATED APPLICATIONS

This application is a national stage application of International Application No. PCT/JP2017/039195, filed Oct. 30, 2017, which designates the United States, incorporated herein by reference, and which claims the benefit of priority from Japanese Patent Application No. 2016-224524, filed Nov. 17, 2016, the entire contents of which are incorporated herein by reference.

TECHNICAL FIELD

The present invention relates generally to a deceleration device.

BACKGROUND ART

Conventionally, deceleration devices are available, which include a combination of an external gear and an internal gear having a greater number of teeth than the external gear so as to reduce the rotation speed of a motor for output from the internal gear. Among such deceleration devices, a known deceleration device includes an external gear with a protrusion and an internal gear with a protrusion so that both protrusions circumferentially come into contact with each other to limit the amounts of rotation of the external gear and the internal gear (for example, disclosed in Japanese Laid-open Patent Application Publication No. 2009-45082).

In related art, however, deceleration gears are each provided with a protrusion. Thus, to set two or more different rotation amounts of the internal gear depending on the specifications of a product including the deceleration device, for example, it is required to set a plurality of kinds of external gears and internal gears having protrusions of different sizes in different positions.

It is an object of the present invention to provide a deceleration device with less inconvenience and a novel structure including a member to limit the amount of rotation of a gear, for example.

SUMMARY

A deceleration device according to the present invention includes, for example, a driven gear configured to rotate about a rotational axis by driving power of a drive mechanism; a deceleration unit including a plurality of gears including a first gear and a second gear, the first gear that rotates by the driven gear, the second gear that rotates about the rotational axis, the deceleration unit configured to rotate the second gear at a reduced speed with respect to the driven gear; a first contact included in the second gear; and a second contact provided separately from the driven gear and the plurality of gears and configured to come into contact with the first contact to stop the rotation of the second gear.

The deceleration device includes, for example, a third gear configured to rotate by the driving power transmitted through the driven gear; and a stopper member to which driving power is transmitted from the third gear, the stopper member configured to rotate about the rotational axis. The second contact is included in the stopper member.

In the deceleration device, for example, the stopper member and the second gear rotate in the same direction, and the stopper member and the second gear rotate at different speeds.

In the deceleration device, for example, the stopper member is rotated by the third gear at a reduced speed with respect to the driven gear.

The deceleration device includes, for example, a rotational element including both the first gear and the third gear.

In the deceleration device, for example, teeth of the first gear are thicker in thickness than teeth of the third gear along the rotational axis.

The deceleration device of the present invention includes, for example, the second contact separately from the driven gear and the gears of the deceleration unit, which can prevent an increase in the number of kinds of the gears of the deceleration unit in the case of setting different rotation amounts of the second gear.

BRIEF DESCRIPTION OF DRAWINGS

FIG. 10 is a cross-sectional view taken along line X-X in FIG. 9;

FIG. 11 is a cross-sectional view taken along line XI-XI in FIG. 9;

DESCRIPTION OF EMBODIMENTS

Figure 1:
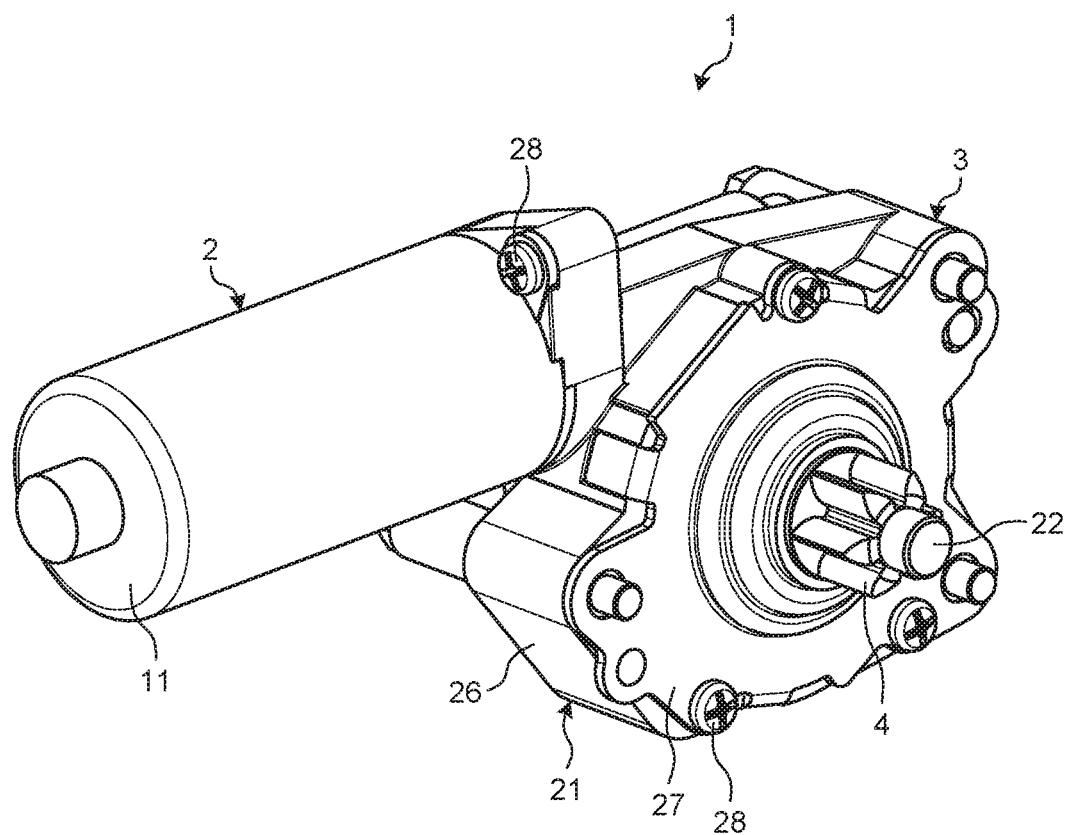
FIG. 1 is an exemplary and schematic perspective view of a drive device in a first embodiment.

Exemplary embodiments of the present invention will be disclosed below. Features described in the following embodiments and functions and results (effects) attained by the features are merely illustrative. The present invention can be implemented by configurations other than those disclosed in the following embodiments. The present invention can attain at least one of various effects (including derivative effects) attained by the configurations.

The following embodiments include similar or same elements. Thus, in the following, similar or same elements are denoted by common reference numerals, and overlapping descriptions thereof may be omitted. Herein, ordinal numbers are assigned for the sake of convenience in order to discriminate components and parts, and are not intended to indicate priority or order.

First Embodiment

Figure 2:
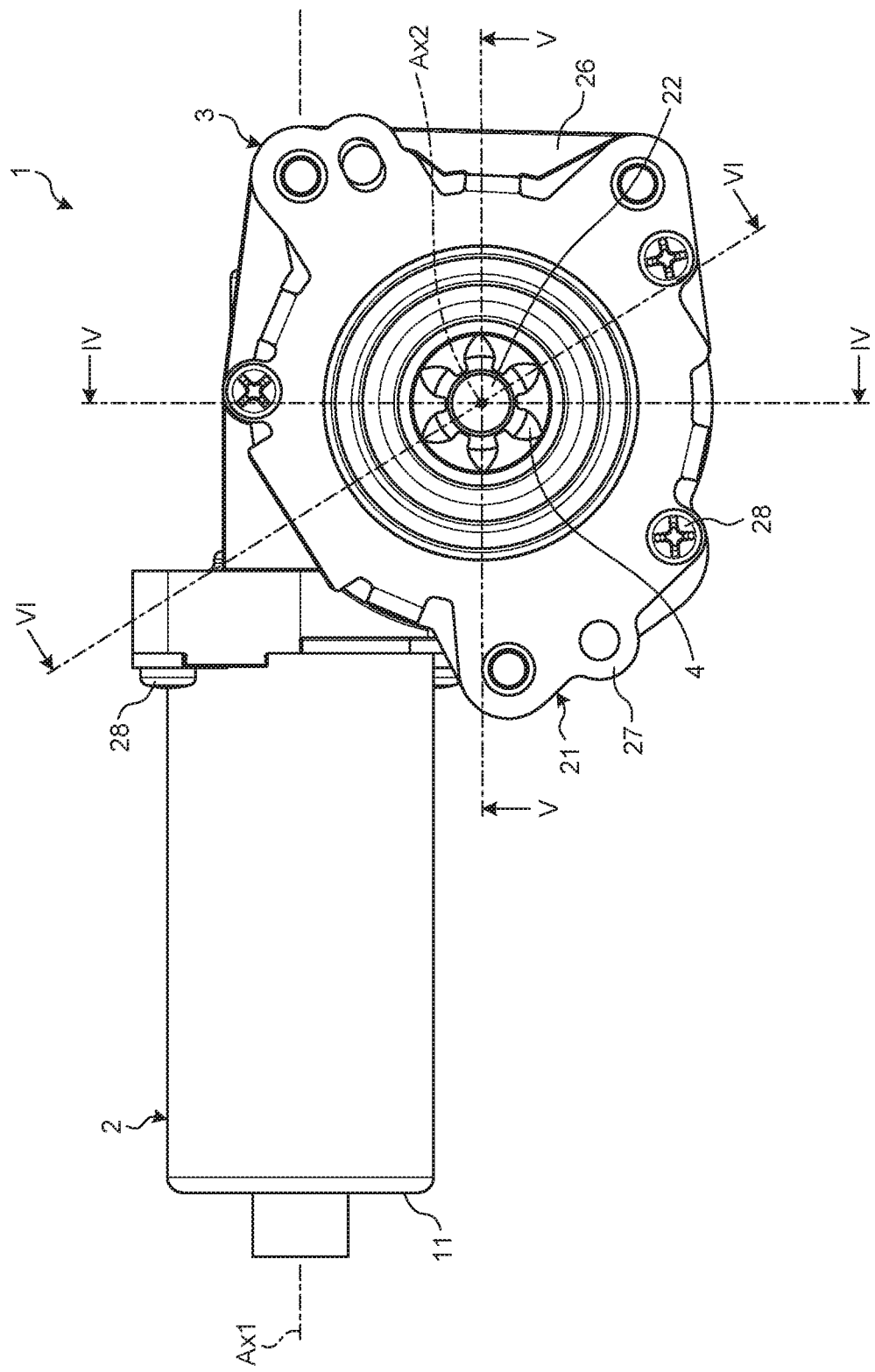
FIG. 2 is an exemplary and schematic front view of the drive device in the first embodiment.

FIG. 1 is an exemplary and schematic perspective view of a drive device 1 in a first embodiment. FIG. 2 is an exemplary and schematic front view of the drive device 1 in the present embodiment. As illustrated in FIGS. 1 and 2, the drive device 1 includes a motor 2 and a deceleration device 3. The drive device 1 allows the deceleration device 3 to reduce the rotation of the motor 2, and rotates a pinion 4 of the deceleration device 3. For example, the drive device 1 is placed on a lifter device for a seat in a vehicle (all not shown), to vertically move the rear end of a seat cushion. The drive device 1 may be placed in another device.

Figure 3:
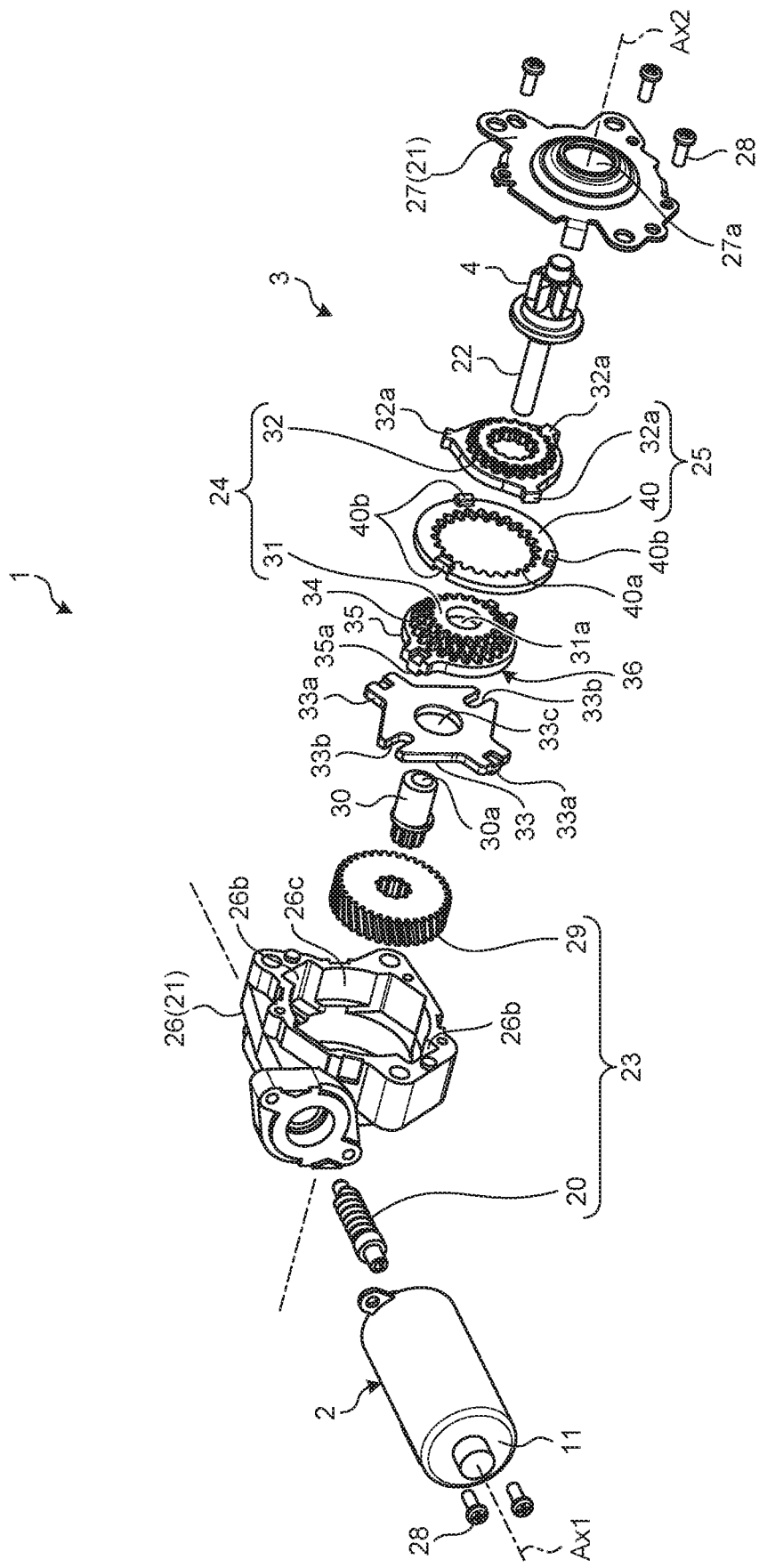
FIG. 3 is an exemplary and schematic exploded perspective view of the drive device in the first embodiment.

FIG. 3 is an exemplary and schematic exploded perspective view of the drive device 1 in the present embodiment. As illustrated in FIG. 3, the motor 2 includes a case 11 and components housed in the case 11. Examples of the components include a motor shaft, a stator, a rotor, a coil, and a magnet (not shown). The motor 2 is driven by electric power to rotate the motor shaft about a rotational axis Ax1. The motor shaft is coupled to a worm 20, and the worm 20 rotates about the rotational axis Ax1 together with the motor shaft. The motor 2 is an exemplary drive mechanism.

Figure 4:
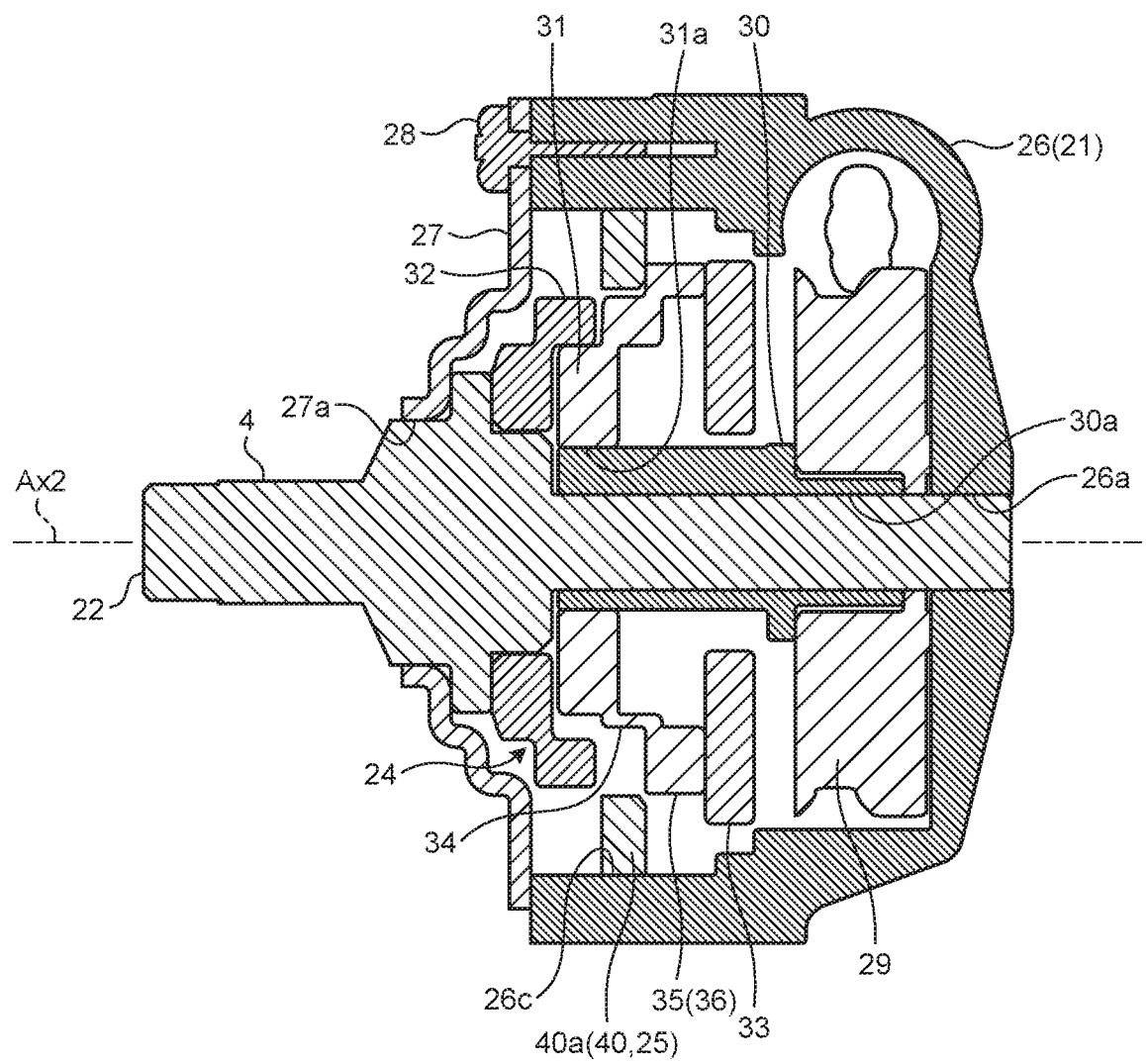
FIG. 4 is a cross-sectional view taken along line IV-IV in FIG. 2.
Figure 5:
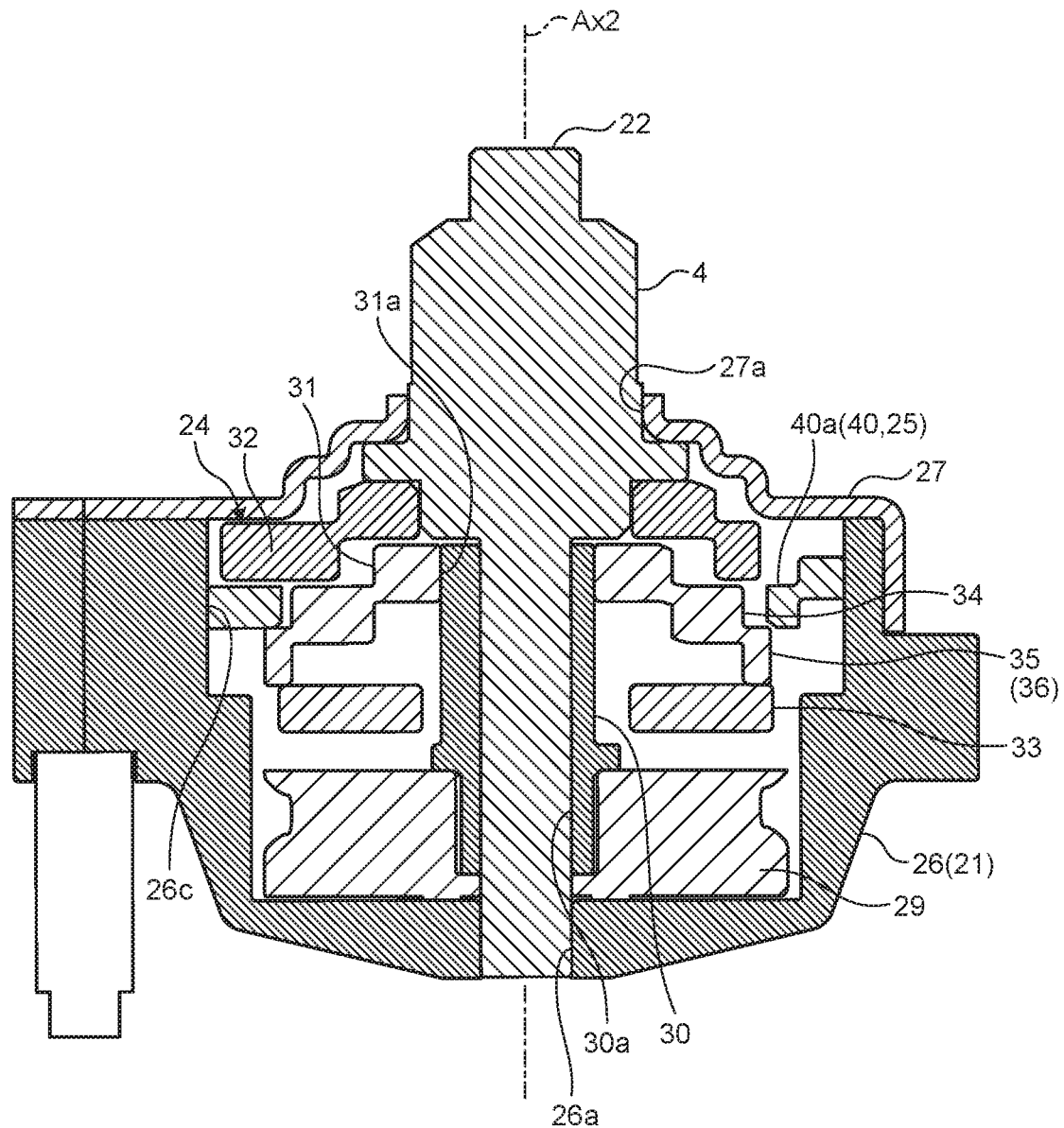
FIG. 5 is a cross-sectional view taken along line V-V in FIG. 2.
Figure 6:
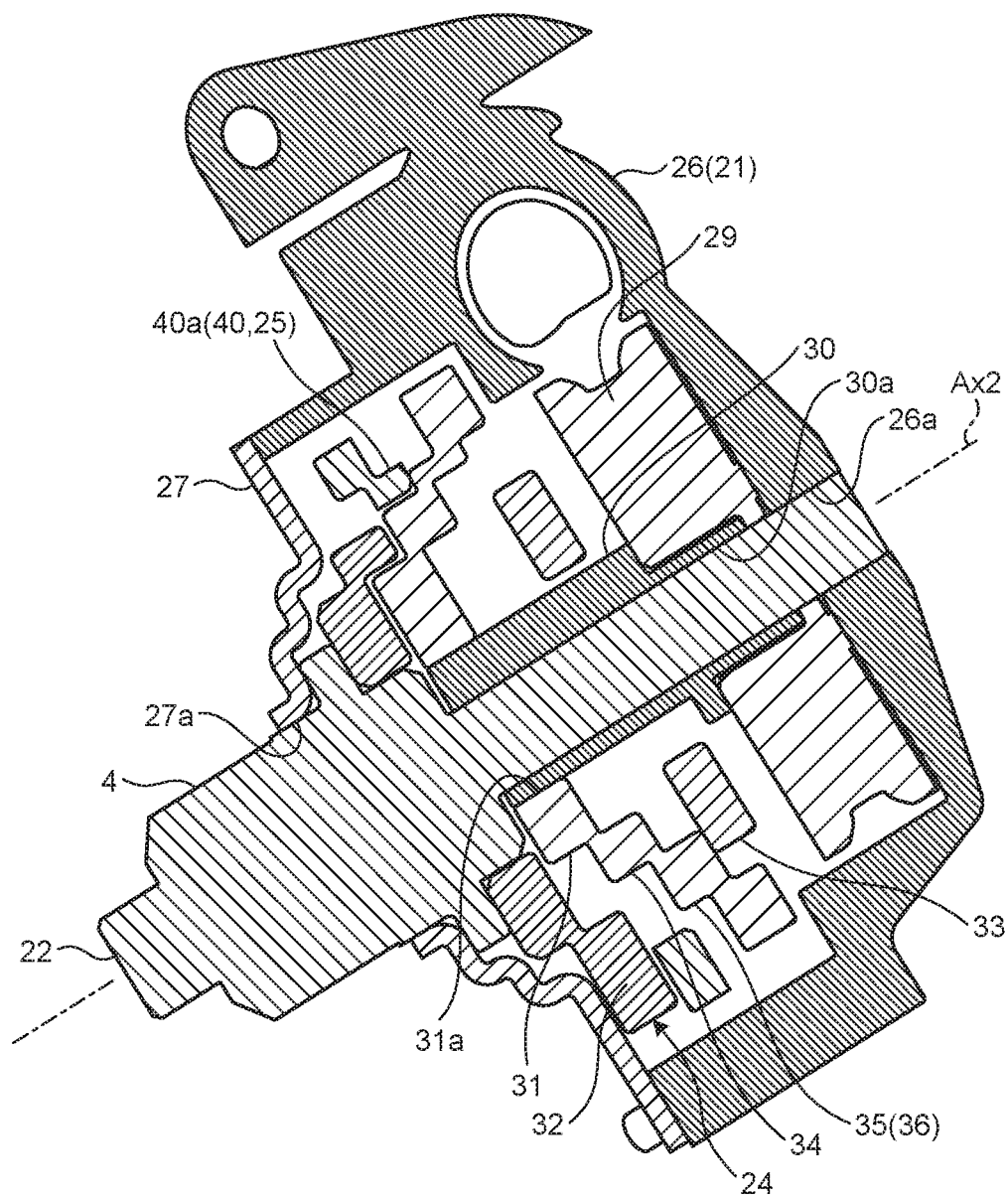
FIG. 6 is a cross-sectional view taken along line VI-VI in FIG. 2.

FIG. 4 is a cross-sectional view taken along line IV-IV in FIG. 2. FIG. 5 is a cross-sectional view taken along line V-V in FIG. 2. FIG. 6 is a cross-sectional view taken along line VI-VI in FIG. 2. As illustrated in FIGS. 3 to 6, the deceleration device 3 includes a housing 21, an output shaft 22, two deceleration units 23 and 24, and a stopper 25. The housing 21 accommodates the output shaft 22, the deceleration units 23 and 24, and the stopper 25. The driving power of the motor 2 is transmitted to the deceleration unit 24 through the deceleration unit 23. In other words, the deceleration unit 23 is an upstream deceleration unit, and the deceleration unit 24 is a downstream deceleration unit.

As illustrated in FIGS. 3 to 6, the housing 21 is formed of a combination of a plurality of members, i.e., a first housing member 26 and a second housing member 27. The first housing member 26 and the second housing member 27 are coupled to each other with fasteners 28 such as screws. The case 11 of the motor 2 is fixed to the first housing member 26 with fasteners 28.

As illustrated in FIGS. 4 to 6, the output shaft 22 is supported by the housing 21 so as to be rotatable about a rotational axis Ax2 extending in a direction intersecting the rotational axis Ax1 of the motor 2. Specifically, the output shaft 22 is supported by the first housing member 26 and the second housing member 27 while being inserted to a hole 26a in the first housing member 26 and a hole 27a in the second housing member 27. Part of the output shaft 22 protrudes from the second housing member 27 to outside the housing 21. The output shaft 22 protruding outside the housing 21 is integrated with the pinion 4. That is, the pinion 4 rotates about the rotational axis Ax2 together with the output shaft 22.

As illustrated in FIG. 3, the deceleration unit 23 includes the worm 20 and a worm wheel 29 to engage with the worm 20. The worm wheel 29 is supported by the output shaft 22 rotatably about the rotational axis Ax2 with respect to the output shaft 22. In the deceleration unit 23, along with the rotation of the worm 20 about the rotational axis Ax1 by the driving power of the motor 2, the worm wheel 29 rotates about the rotational axis Ax2. The deceleration unit 23 rotates the worm wheel 29 at a reduced speed with respect to the motor shaft of the motor 2. The worm wheel 29 is an exemplary driven gear.

The worm wheel 29 includes an eccentric shaft 30 that is eccentric to the output shaft 22 (rotational axis Ax2). The eccentric shaft 30 is provided with a hole 30a around the rotational axis Ax2, and the output shaft 22 is inserted into the hole 30a. The eccentric shaft 30 rotates together with the worm wheel 29.

Figure 7:
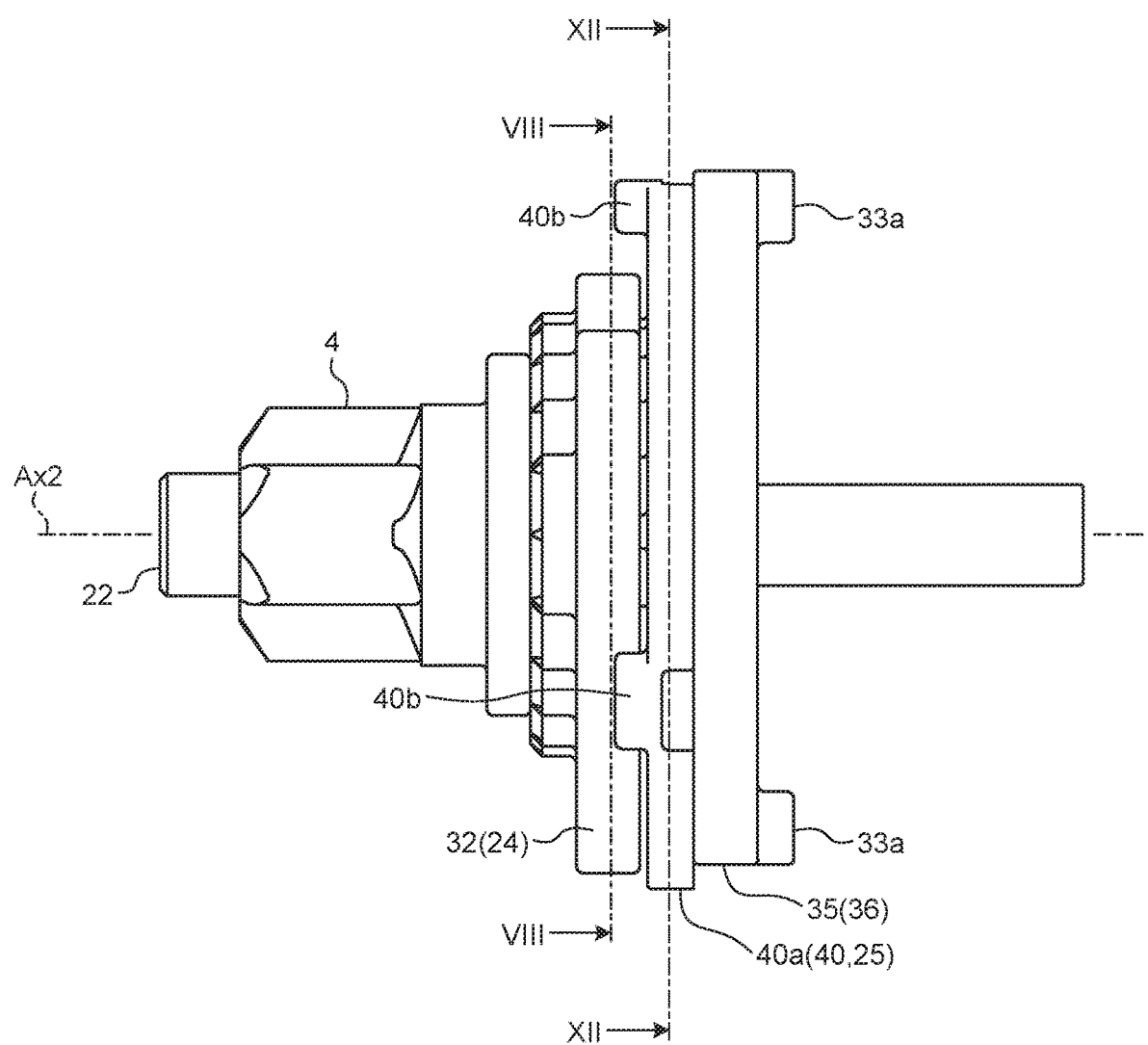
FIG. 7 is an exemplary and schematic side view of a part of a deceleration device of the drive device in the first embodiment.
Figure 8:
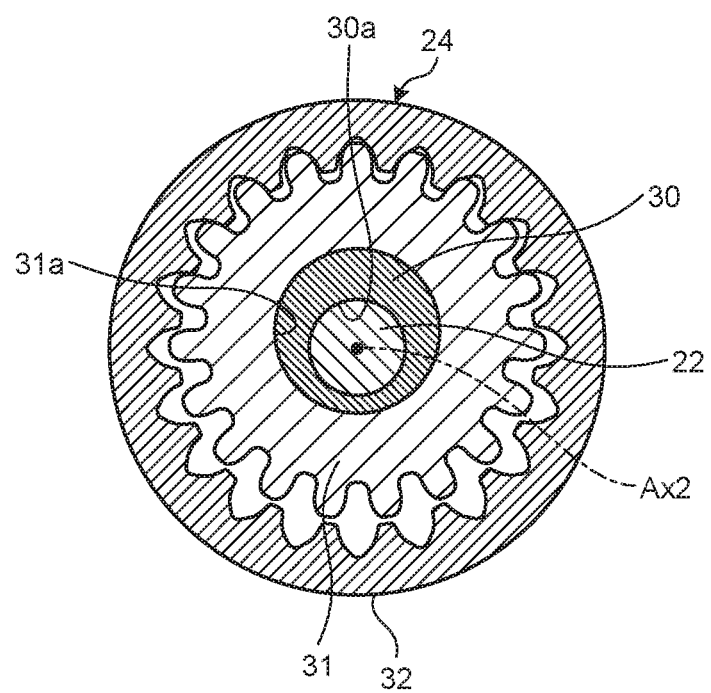
FIG. 8 is a cross-sectional view taken along line VIII-VIII in FIG. 7.

FIG. 7 is an exemplary and schematic side view of a part of the deceleration device 3 of the drive device 1 in the present embodiment. FIG. 8 is a cross-sectional view taken along line VIII-VIII in FIG. 7. As illustrated in FIGS. 3, 4, 7, 8, and other figures, the deceleration unit 24 includes an external gear 31 and an internal gear 32 to engage with the external gear 31. The external gear 31 is an exemplary first gear, and the internal gear 32 is an exemplary second gear.

The external gear 31 is rotated (revolved) about the rotational axis Ax2 by the worm wheel 29. Specifically, the external gear 31 is provided with a hole 31a into which the output shaft 22 and the eccentric shaft 30 are inserted. The external gear 31 is rotatably supported relative to the eccentric shaft 30. Thus, along with the rotation of the eccentric shaft 30 together with the worm wheel 29, the external gear 31 rotates (revolves) about the rotational axis Ax2 while the center of the external gear 31 draws a circular locus having a radius being a distance between the center and the rotational axis Ax2.

The external gear 31, an external gear 34, and a flange 35 constitute a rotational element 36 as a whole. The center of the external gear 34 matches the center of the external gear 31. Such an external gear 34 rotates (revolves) about the rotational axis Ax2 together with the external gear 31. The external gear 31 and the external gear 34 may be separated. The external gear 31 and the external gear 34 may have the same number or different numbers of teeth. The external gear 34 is an exemplary third gear.

Figure 9:
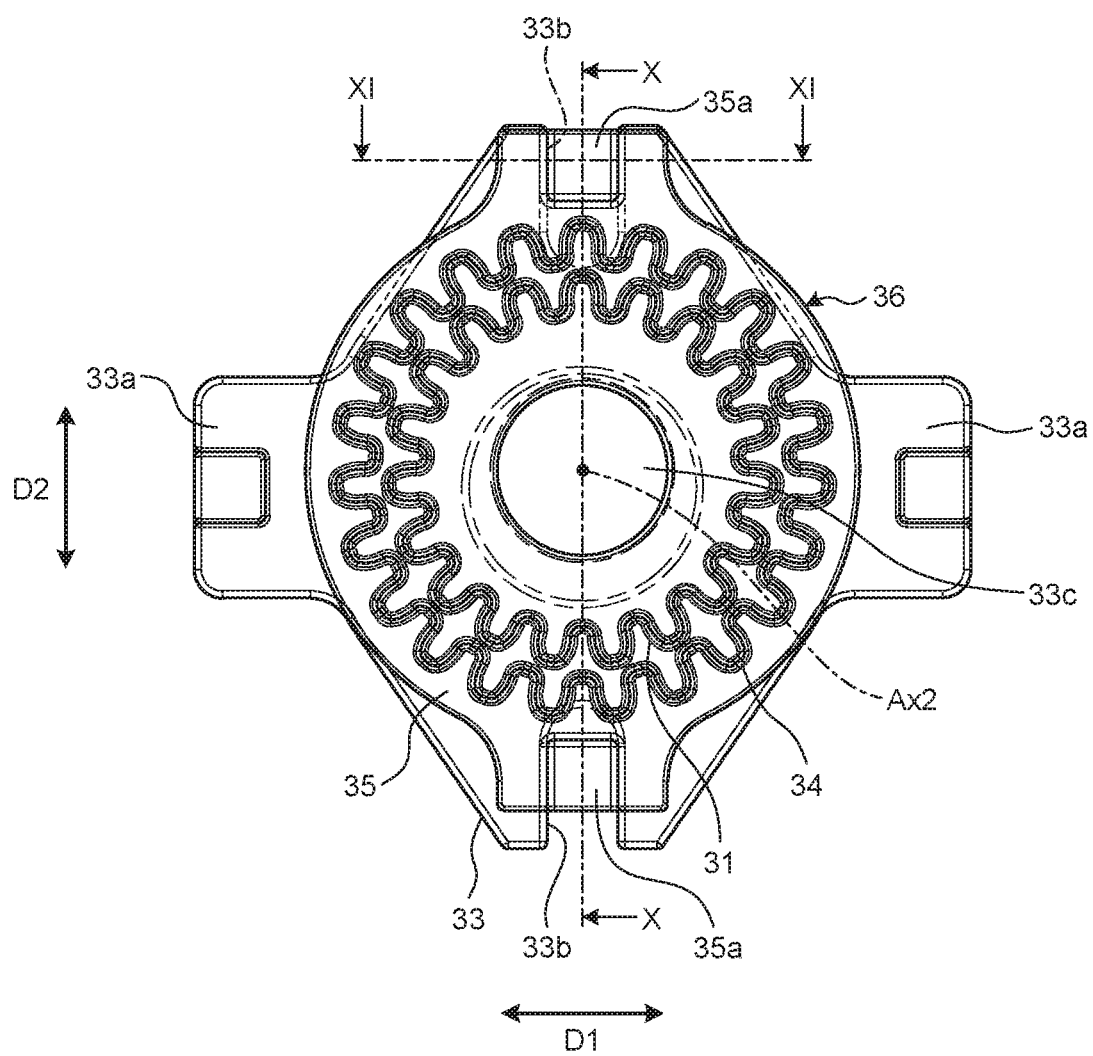
FIG. 9 is an exemplary and schematic front view of a part of the deceleration device of the drive device in the first embodiment.

FIG. 9 is an exemplary and schematic front view of a part of the deceleration device 3 of the drive device 1 in the present embodiment. FIG. 10 is a cross-sectional view taken along line X-X in FIG. 9. FIG. 11 is a cross-sectional view taken along line XI-XI in FIG. 9. As illustrated in FIGS. 3, 9 to 11, and other figures, the rotation of the external gear 31 (rotational element 36) is restricted by a guide plate 33. The guide plate 33 is provided with a pair of protrusions 33a. The pair of protrusions 33a protrude oppositely in a first orthogonal direction D1 (FIG. 9) orthogonal to the rotational axis Ax2. The pair of protrusions 33a are contained in a pair of recesses 26b (FIG. 3) in the first housing member 26. The pair of protrusions 33a are movably supported by the pair of recesses 26b in the first orthogonal direction D1, and restricted from rotating about the rotational axis Ax2 by the recesses 26b. The guide plate 33 is further provided with recesses 33b that are recessed in a direction orthogonal to the rotational axis Ax2 and intersecting (as an example, orthogonal) the first orthogonal direction D1. The flange 35 of the external gear 31 is provided with a pair of protrusions 35a contained in the pair of recesses 33b. The pair of protrusions 35a are movably supported by the pair of recesses 33b in a second orthogonal direction D2 and restricted from rotating about the rotational axis Ax2 by the pair of recesses 33b. With the above configuration, the external gear 31 (rotational element 36, external gear 34) is restricted from rotating by the guide plate 33. That is, the external gear 31 (rotational element 36, external gear 34), while being non-rotatable itself, rotates (revolves) about the rotational axis Ax2. The guide plate 33 is provided with a hole 33c through which the output shaft 22 and the eccentric shaft 30 are inserted.

As illustrated in FIGS. 3 and 8, the internal gear 32 is coupled to the output shaft 22, and rotates about the rotational axis Ax2 together with the output shaft 22. The internal gear 32 includes a greater number of teeth than the external gear 31. For example, the number of teeth of the internal gear 32 is larger than that of the external gear 31 by one or two. The internal gear 32 is engaged with the external gear 31 at one point (FIG. 8). Thus, along with the revolution of the external gear 31, the internal gear 32 rotates while the engaged part of the internal gear 32 and the external gear 31 moves about the rotational axis Ax2.

In the deceleration unit 24 as configured above, the internal gear 32 has a larger number of teeth than the external gear 31, and hence the internal gear 32 rotates at a reduced speed with respect to the worm wheel 29. The output shaft 22 coupled to the internal gear 32 and the pinion 4 of the output shaft 22 rotate together with the internal gear 32.

As illustrated in FIGS. 3 to 6, the stopper 25 includes a plurality of first contacts 32a provided to the internal gear 32, and a stopper member 40.

The first contacts 32a are located on the outer circumference of the internal gear 32, and protrude in a direction orthogonal to the rotational axis Ax2 (radially outside the internal gear 32). The first contacts 32a are equally spaced apart from each other about the rotational axis Ax2. The first contacts 32a rotate about the rotational axis Ax2 together with the internal gear 32. The first contacts 32a are also referred to as protrusions. Although the figures show the multiple first contacts 32a, the number of the first contacts 32a may be one. The first contacts 32a may be separate from the internal gear 32.

The stopper member 40 includes an internal gear 40a and a plurality of second contacts 40b. The stopper member 40 (internal gear 40a) is supported by a bearing 26c of the first housing member 26 rotatably about the rotational axis Ax2. The internal gear 40a is, for example, formed by fully cutting a plate member with a denture mold. Such a structure enables a wider effective width of the teeth of the internal gear 40a than the internal gear 40a formed by half cutting. The internal gear 40a is an exemplary fourth gear.

Figure 12:
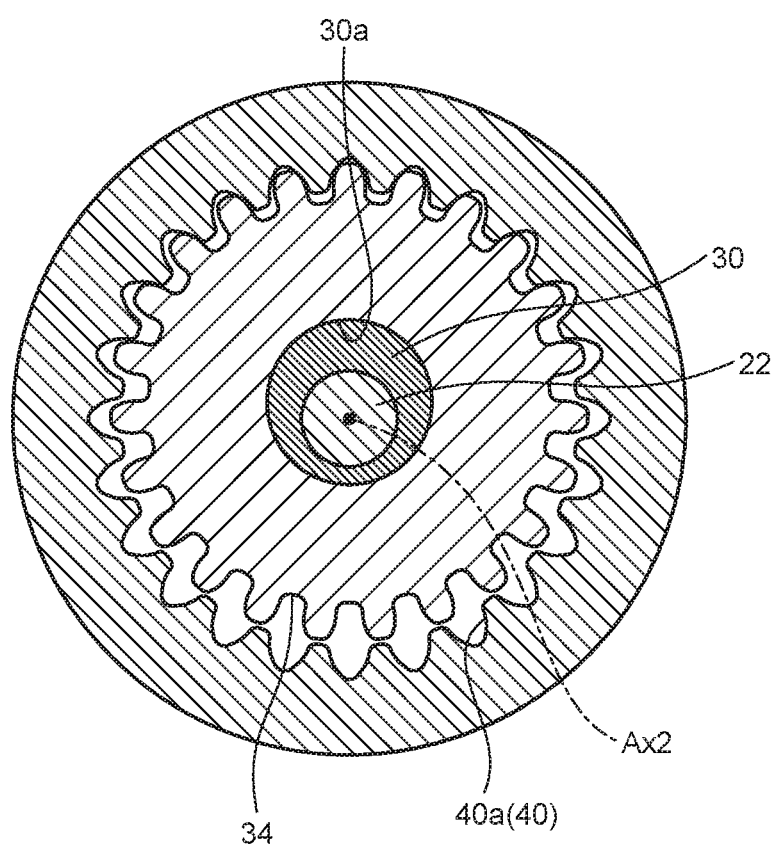
FIG. 12 is a cross-sectional view taken along line XII-XII in FIG. 7.

FIG. 12 is a cross-sectional view taken along line XII-XII in FIG. 7. As illustrated in FIG. 12, the internal gear 40a is engaged with the external gear 34. The internal gear 40a has a larger number of teeth than the external gear 34. For example, the number of teeth of the internal gear 40a is larger than that of teeth of the external gear 34 by one or two. The internal gear 40a is engaged with the external gear 34 at one point. Thus, along with the revolution of the external gear 34, the internal gear 40a rotates while the engaged part of the internal gear 40a and the external gear 34 moves about the rotational axis Ax2. In such a configuration, the internal gear 40a (stopper member 40) rotates at a reduced speed with respect to the worm wheel 29 (external gear 34).

As illustrated in FIG. 3, the second contacts 40b are located on the outer circumference of the internal gear 32, that is, the outer circumference of the stopper member 40, and protrude toward the internal gear 32 along the rotational axis Ax2. The second contacts 40b are placed side by side with the outer circumference of the internal gear 32 in a direction orthogonal to the rotational axis Ax2 (FIG. 7). The second contacts 40b can contact with the first contacts 32a in the circumferential direction of the rotational axis Ax2. The second contacts 40b are substantially equally spaced apart from each other about the rotational axis Ax2. Specifically, one second contact 40b is placed between two adjacent first contacts 32a. The second contacts 40b rotate about the rotational axis Ax2 together with the internal gear 32. The second contacts 40b are also referred to as protrusions.

The first contacts 32a and the second contacts 40b contact with each other in the circumferential direction of the rotational axis Ax2 to be able to stop the rotations of the worm wheel 29, the external gear 31, and the internal gear 32.

As illustrated in FIG. 10, teeth 31b of the external gear 31 have a thickness T1 larger than a thickness T2 of teeth 34a of the external gear 34 along the rotational axis Ax2. For better understanding, FIG. 10 depicts the thickness T1 in an exaggerated manner as compared with the other figures. The reason why the teeth 31b of the external gear 31 are set to have the thickness T1 larger than the thickness T2 of the teeth 34a of the external gear 34 is to enhance the strength of the external gear 31 to which a load of an occupant is applied from a seat through the internal gear 32.

Next, the operation of the deceleration device 3 is described. Along with the rotation of the worm 20 together with the motor shaft of the motor 2 by the driving power of the motor 2, the worm wheel 29 engaging with the worm 20 rotates about the rotational axis Ax2. This rotates the eccentric shaft 30 of the worm wheel 29 and revolves the external gear 31 supported by the eccentric shaft 30 about the rotational axis Ax2 while the external gear 31 is restricted from rotating by the guide plate 33. Due to the revolution of the external gear 31, the internal gear 32 rotates about the rotational axis Ax2 at a reduced rotation speed with respect to the worm wheel 29. Thereby, the pinion 4 coupled to the internal gear 32 through the output shaft 22 rotates together with the internal gear 32.

In the above operation, the external gear 34 rotates (revolves) about the rotational axis Ax2 together with the external gear 31. By the rotation (revolution) of the external gear 34, the internal gear 40a (stopper member 40) rotates about the rotational axis Ax2 at a reduced rotation speed with respect to the worm wheel 29.

In the above operation, the first contacts 32a rotate together with the internal gear 32, and the second contacts 40b rotate together with the stopper member 40 (internal gear 40a). In this case, the stopper member 40 and the internal gear 32 rotate in different manners. Specifically, the stopper member 40 and the internal gear 32 rotate in the same direction but at different rotation speeds. Either of the stopper member and the internal gear 32 may rotate at a higher speed than the other. Their rotation speeds are appropriately set depending on the numbers of the respective teeth of the internal gear 40a of the stopper member 40, the external gear 31, the internal gear 32, and the external gear 34. Because of the different rotation speeds of the stopper member 40 and the internal gear 32, when the first contacts 32a and the second contacts 40b rotate in one direction about the rotational axis Ax2, the faster contacts catch up with the slower contacts, abutting against (hooking) each other in the circumferential direction of the rotational axis Ax2. This places the forces of the gears (internal gear 40a, external gear 31, internal gear 32, external gear 34) in a balanced state to stop the gears (internal gear 40a, external gear 31, internal gear 32, external gear 34) (first stop state). When the first contacts 32a and the second contacts 40b rotate in the opposite direction along the rotational axis Ax2 (reverse rotation) from the first stop state, the faster contacts catch up with the slower contacts, abutting against each other in the circumferential direction of the rotational axis Ax2 to stop the gears (internal gear 40a, external gear 31, internal gear 32, external gear 34) (second stop state). Due to the first stop state and the second stop state, the vertical movable range of the seat is set. In the operation from the first stop state to the second stop state, the rotation amount (rotation angle) of the internal gear 32 and the rotation amount (rotation angle) of the pinion 4 are determined by a difference in rotation speeds between the stopper member 40 and the internal gear 32. In the present embodiment, for example, the rotation amounts are set to 360 degrees (one rotation) or more. The rotation amounts may be less than 360 degrees (one rotation).

As described above, according to the deceleration device 3 of the present embodiment, the first contacts 32a and the second contacts 40b come into contact with each other in the circumferential direction of the rotational axis Ax2 to thereby stop the rotation of the internal gear 32. The second contacts 40b are provided separately from the worm wheel 29 and the gears (external gear 31, internal gear 32) of the deceleration unit 24. Thus, to set different rotation amounts of the internal gear 32 depending on the specifications of the vertical movable amount of the seat, for example, a plurality of members (in the present embodiment, stopper member 40) including the second contacts 40b of different sizes in different positions can be simply set. This eliminates the necessity to set different kinds of the internal gears 32 and the external gears 31 depending on the specifications of the vertical movable amount of the seat, preventing an increase in the number of kinds of the internal gears 32 and the external gears 31. In other words, it is possible to prevent an increase in the number of kinds of members for which relatively high dimension accuracy is required.

In the present embodiment, the worm wheel 29 and the internal gear 32 rotate about the same rotational axis Ax2. In other words, the worm wheel 29 and the internal gear 32 are coaxially disposed. This enables downsizing of the deceleration device 3 as compared with the worm wheel 29 and the internal gear 32 not coaxially disposed, for example.

In the present embodiment, the deceleration device 3 further includes the external gear 34 and the stopper member 40. The external gear 34 is rotated by driving power transmitted through the worm wheel 29. The stopper member 40 includes the second contacts 40b, and the internal gear 40a to which driving power is transmitted from the external gear 34. The stopper member 40 is rotated about the rotational axis Ax2 by the driving power. The stopper member 40 and the internal gear 32 rotate in different manners. Thus, for example, by the settings of the rotations of the stopper member 40 and the internal gear 32, the rotation amount of the internal gear 32 is decided. This provides greater flexibility to set the rotation amount of the internal gear 32 than when the second contacts 40b are non-rotational, for example.

In the present embodiment, the stopper member 40 and the internal gear 32 rotate in the same direction at different rotation speeds. Thus, the internal gear 32 (pinion 4) can be rotated by 360 degrees or more depending on the settings of the rotation speed of the stopper member 40 and the rotation speed of the internal gear 32.

In the present embodiment, the stopper member 40 is rotated at a reduced speed with respect to the worm wheel 29 due to the external gear 34 and the internal gear 40a. Thus, for example, the second contacts 40b rotate at a reduced speed with respect to the worm wheel 29. The first contacts 32a also rotate at a reduced speed with respect to the worm wheel 29 by the deceleration unit 24. Thus, the first contacts 32a and the second contacts 40b, while both decelerated with respect to the worm wheel 29, come into contact with each other. This can reduce impact and collision noise occurring from the contact between the first contacts 32a and the second contacts 40b as compared with when the second contacts 40b are not reduced in speed, for example.

In the present embodiment, the deceleration device 3 includes the rotational element 36 including the external gear 31 to engage with the internal gear 32 of the gears (external gear 31, internal gear 32) of the deceleration unit 24, and the external gear 34. That is, the number of components is decreased because of the one rotational element 36 including the two gears (external gear 31, external gear 34), for example. This also eliminates the necessity for relative positioning of the internal gear 32 and the external gear 34.

In the present embodiment, the teeth 31b of the external gear 31 engaged with the internal gear 32 have the thickness T1 larger than the thickness T2 of the teeth 34a of the external gear 34 along the rotational axis Ax2. This enhances the strength of the external gear 31 to which the load of an occupant is applied from the seat through the internal gear 32.

In the present embodiment, the first contacts 32a protrude in the direction orthogonal to the rotational axis Ax2, while the second contacts 40b protrude toward the internal gear 32 along the rotational axis Ax2 to be side by side with the outer circumference of the internal gear 32 in the direction orthogonal to the rotational axis Ax2. This results in downsizing the deceleration device 3 along the rotational axis Ax2.

The second contacts 40b may protrude in the direction orthogonal to the rotational axis Ax2, while the first contacts 32a may protrude toward the stopper member 40 along the rotational axis Ax2 to be side by side with the outer circumference of the stopper member 40 in the direction orthogonal to the rotational axis Ax2. Either of the first contacts 32a and the second contacts 40b may be recesses that accommodate the other.

The second contacts 40b may be fixed to the housing 21. In this case, the second contacts 40b may be molded integrally with the housing 21.

The rotational element 36 (external gear 31, external gear 34) may be configured to rotate in addition to revolving. In this case, for example, a fixed internal gear with a larger number of teeth than the external gear 34 may be fixed to the housing 21, so that the fixed internal gear and the external gear 34 may engage with each other.

Second Embodiment

Figure 13:
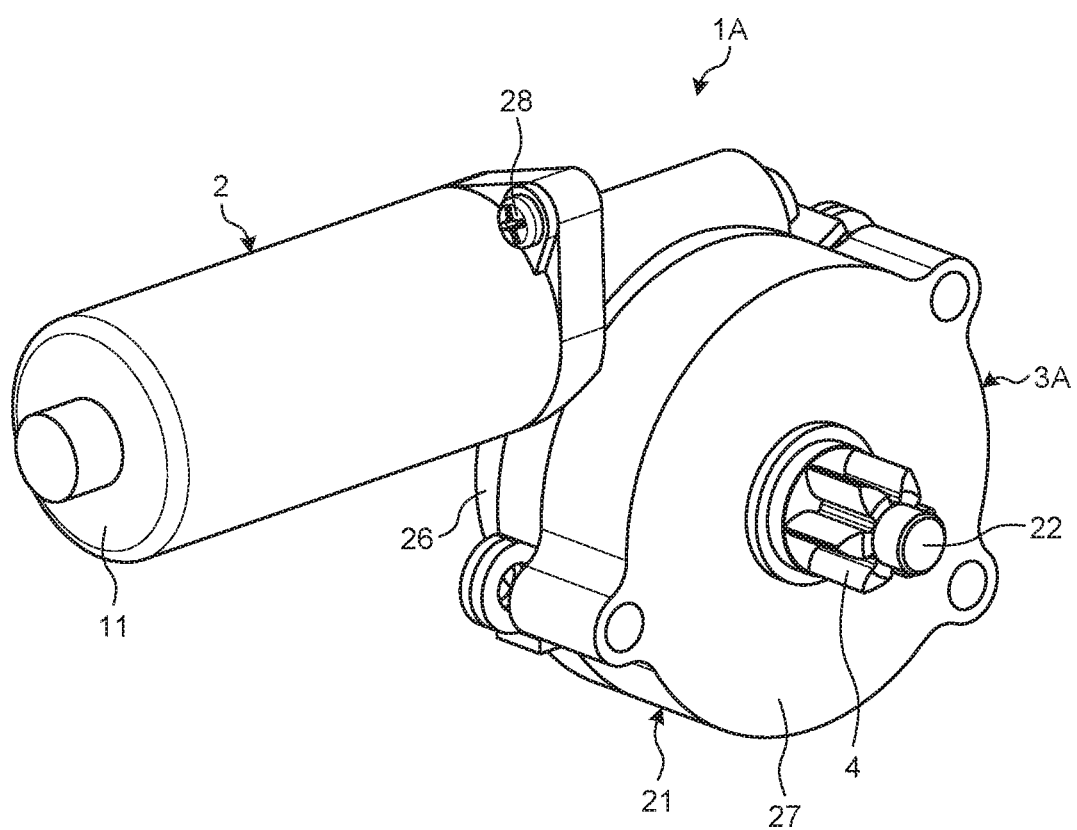
FIG. 13 is an exemplary and schematic perspective view of a drive device in a second embodiment.
Figure 14:
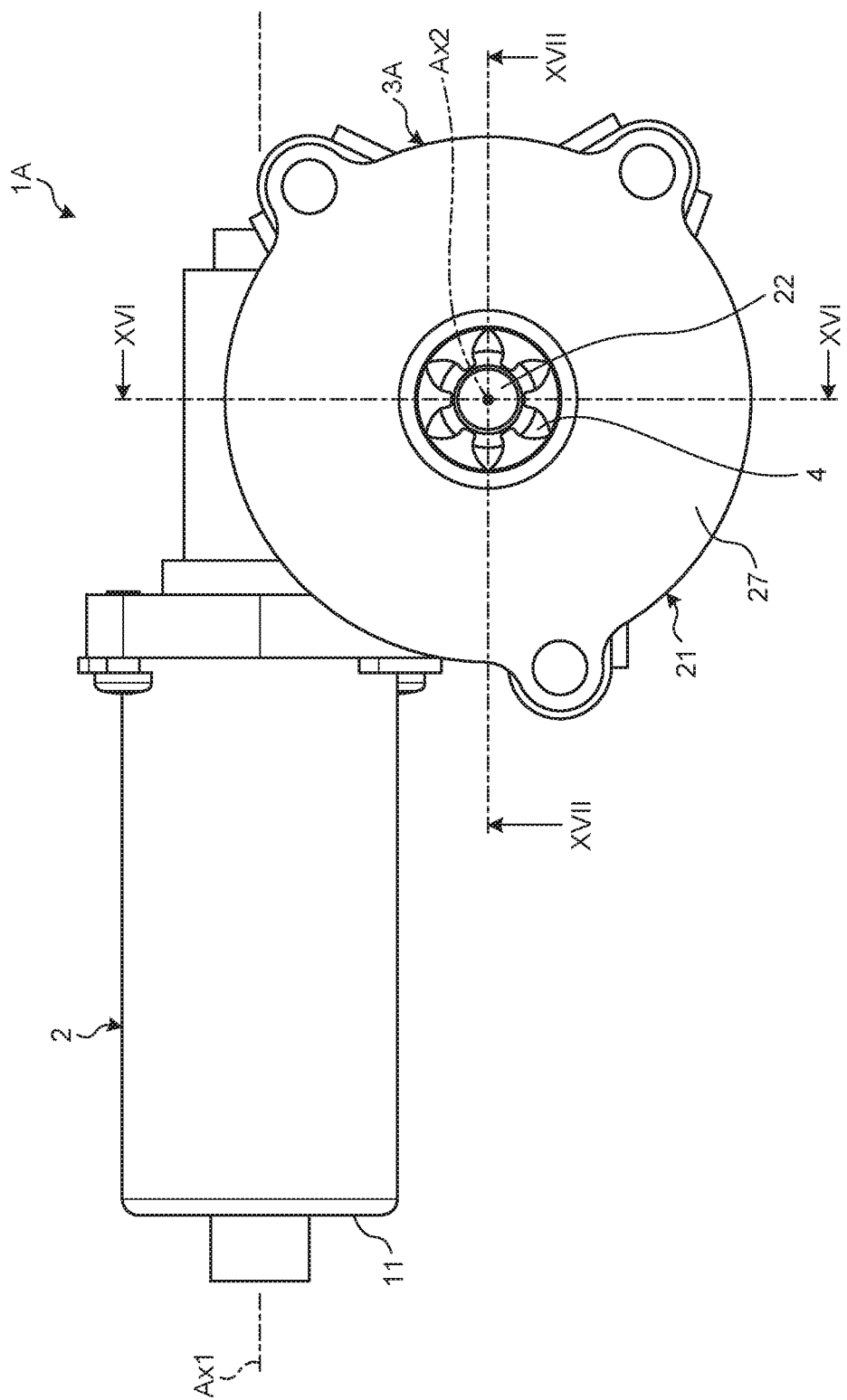
FIG. 14 is an exemplary and schematic front view of the drive device in the second embodiment.
Figure 15:
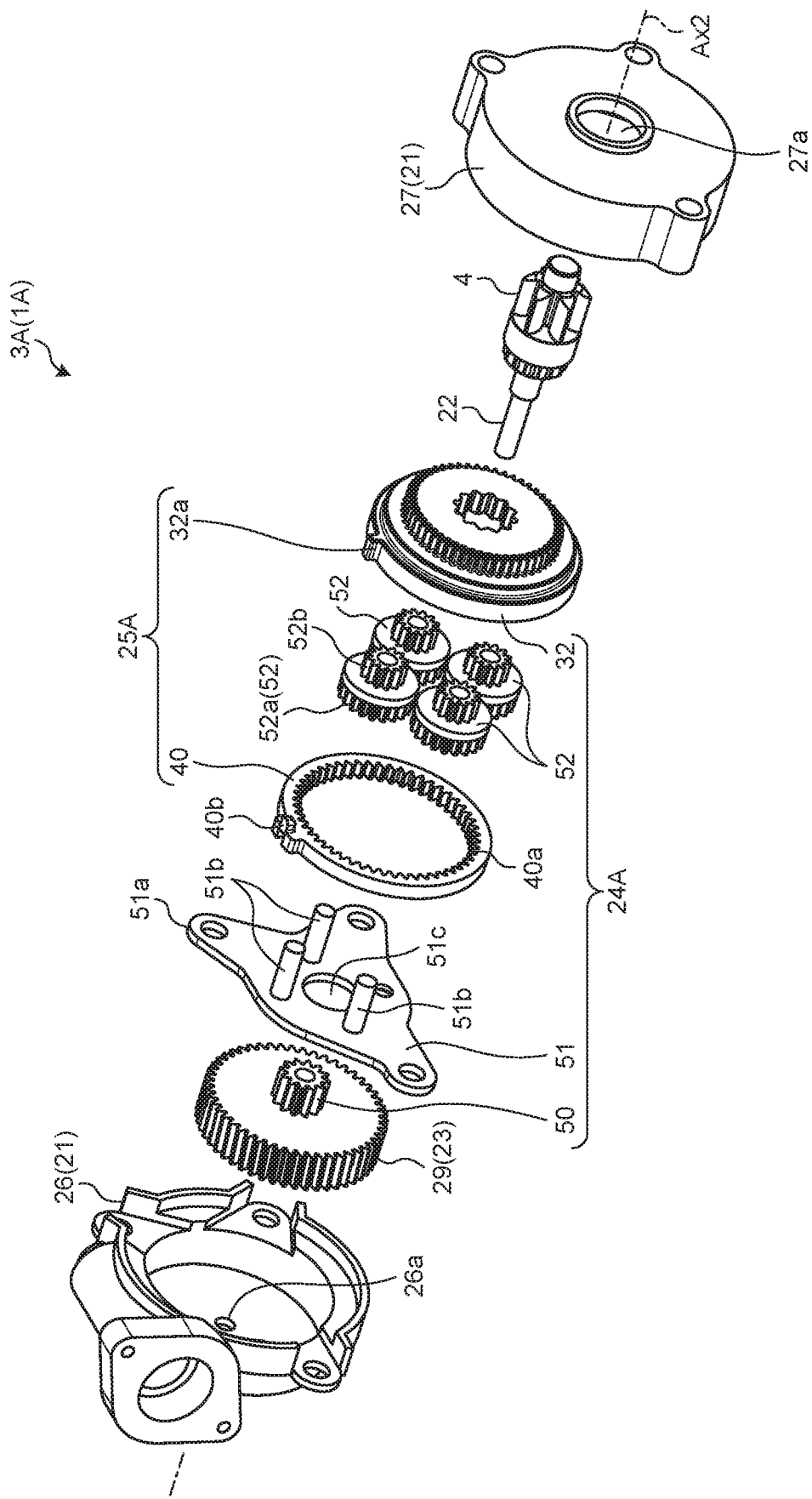
FIG. 15 is an exemplary and schematic exploded perspective view of the drive device in the second embodiment.

FIG. 13 is an exemplary and schematic perspective view of a drive device 1A in a second embodiment. FIG. 14 is an exemplary and schematic front view of the drive device 1A in the present embodiment. FIG. 15 is an exemplary and schematic exploded perspective view of the drive device 1A in the present embodiment. The drive device 1A of the present embodiment illustrated in FIGS. 13 to 15 includes a motor 2 and a deceleration device 3A, as with the drive device 1 of the first embodiment. Thus, the present embodiment can also attain the same or similar results based on the same or similar configurations as the first embodiment.

However, as illustrated in FIG. 15, the present embodiment is different from the first embodiment 00 in a downstream deceleration unit 24A and a stopper 25A of the deceleration device 3A. The following will mainly describe the differences from the first embodiment.

Figure 16:
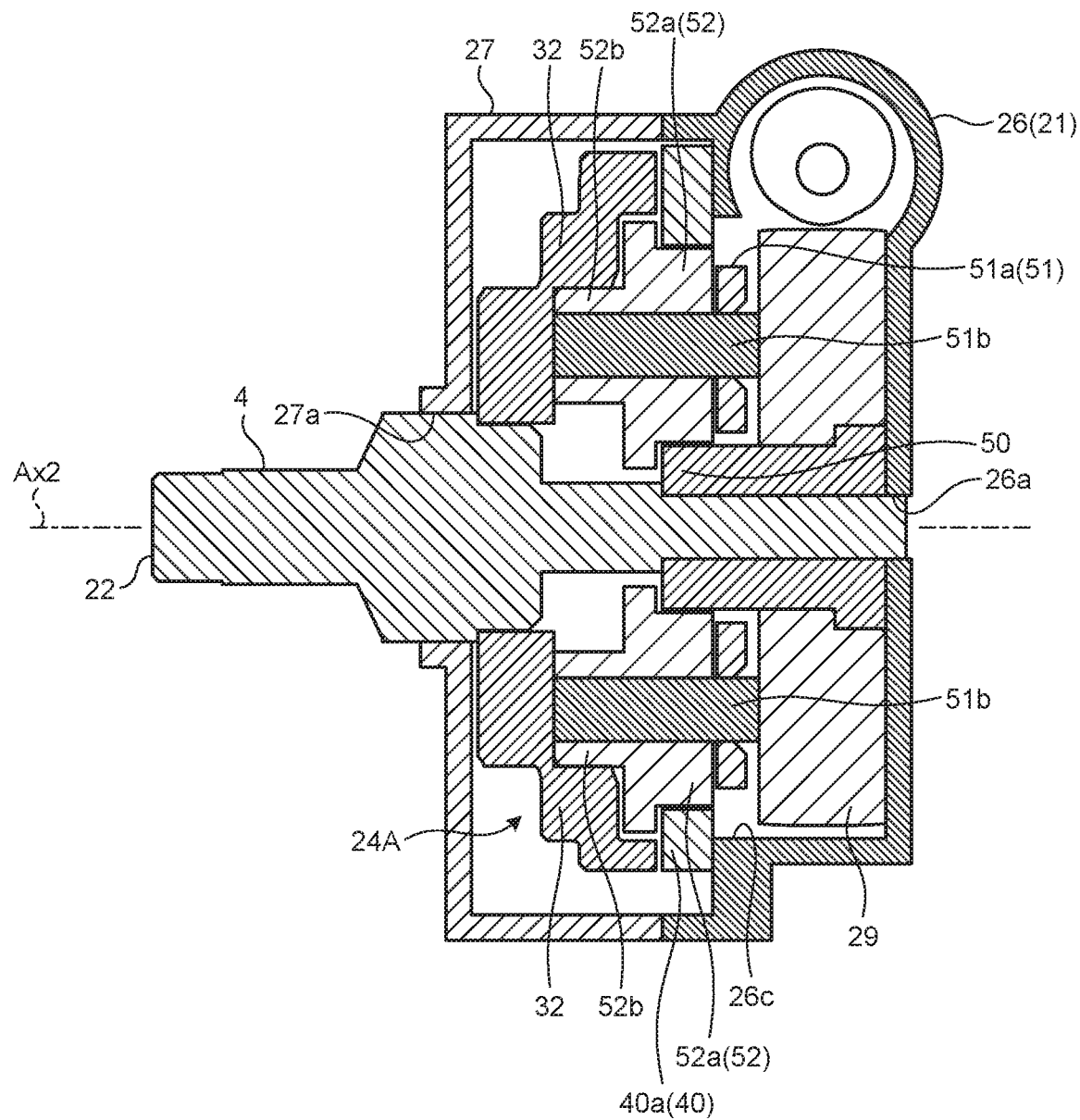
FIG. 16 is a cross-sectional view taken along line XVI-XVI in FIG. 14.
Figure 17:
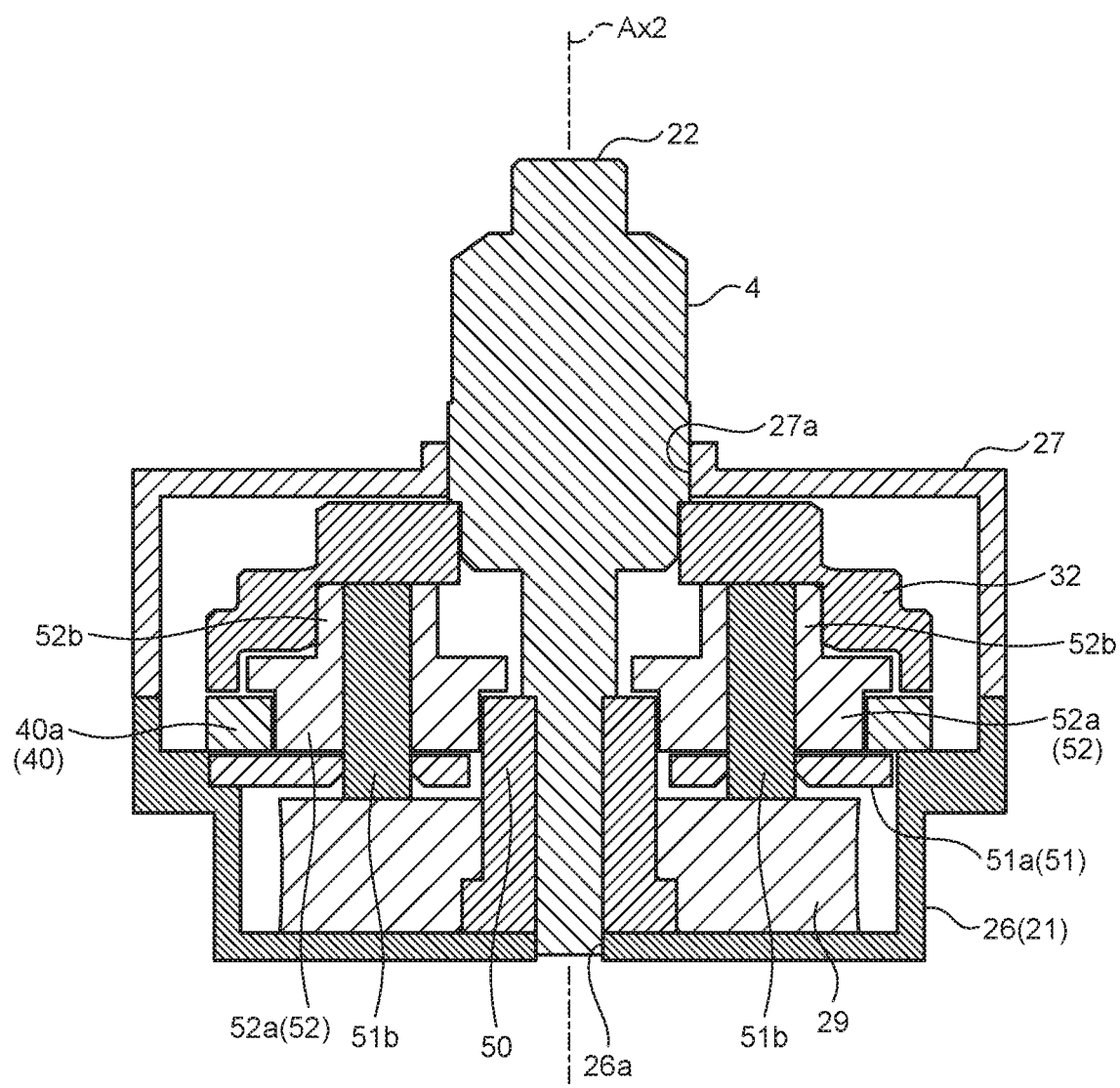
FIG. 17 is a cross-sectional view taken along line XVII-XVII in FIG. 14.

FIG. 16 is a cross-sectional view taken along line XVI-XVI in FIG. 14. FIG. 17 is a cross-sectional view taken along line XVII-XVII in FIG. 14. As illustrated in FIGS. 15 to 17, the deceleration unit 24A is formed as a planetary gear decelerator. Specifically, the deceleration unit 24A includes a sun gear 50, a planetary carrier 51, a plurality of planetary gears 52, and an internal gear 32.

The sun gear 50 is integrated with the worm wheel 29, to rotate about the rotational axis Ax2 together with the worm wheel 29. The output shaft 22 is inserted into a central hole in the sun gear 50. The sun gear 50 is an exemplary first gear.

Figure 18:
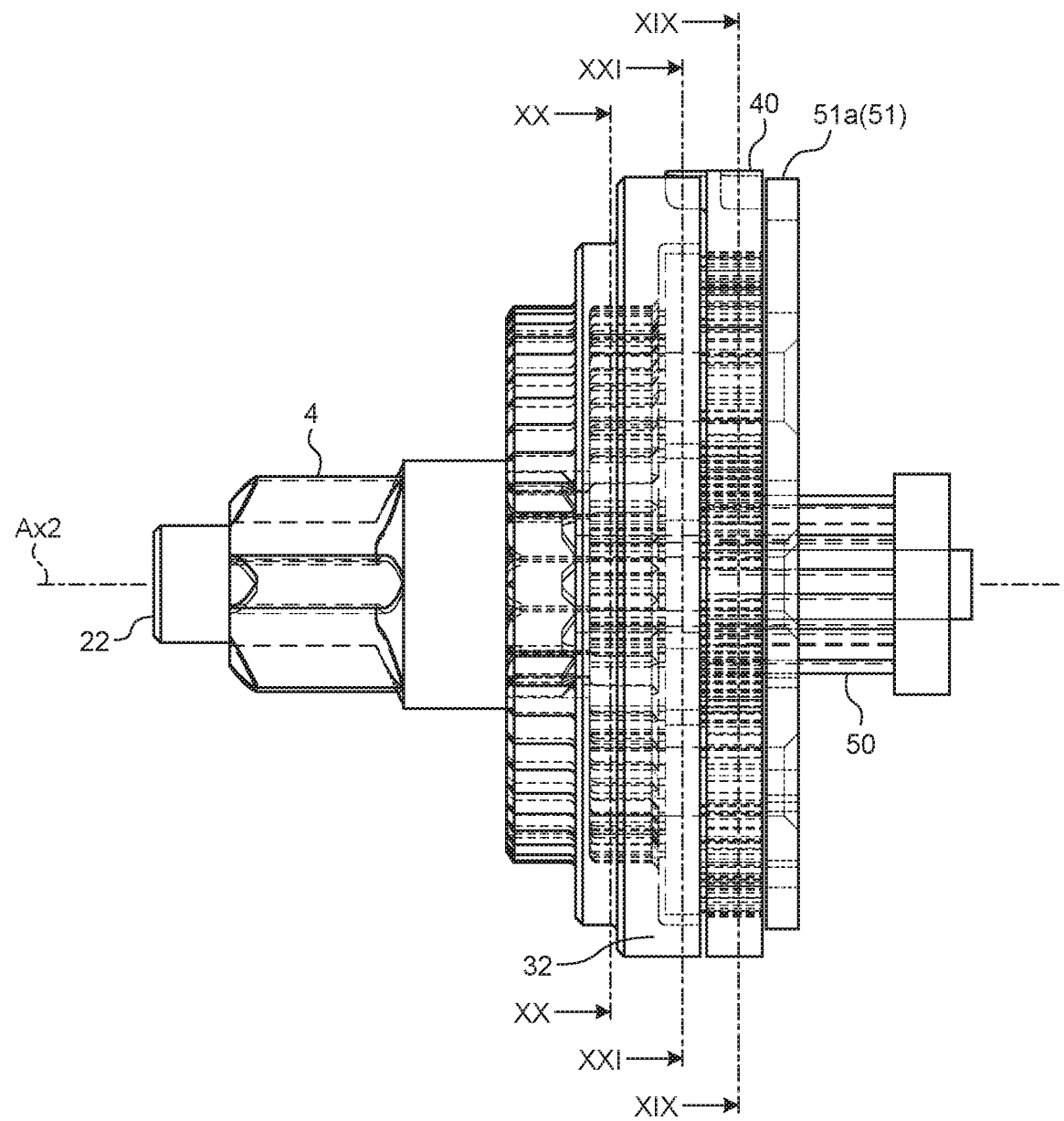
FIG. 18 is an exemplary and schematic side view of a part of a deceleration device of the drive device in the second embodiment.

FIG. 18 is an exemplary and schematic side view of a part of the deceleration device 3A of the drive device 1A in the present embodiment. As illustrated in FIG. 18, the planetary carrier 51 and the stopper member 40 are placed on top of each other. As illustrated in FIGS. 15 and 18, the planetary carrier 51 includes a plate 51a and a plurality of shafts 51b. As understood from FIG. 15, the plate 51a, while placed between the first housing member 26 and the second housing member 27, is fastened (fixed) to the first housing member 26 and the second housing member 27 with fasteners such as screws. The plate 51a is provided with a hole 51c through which the output shaft 22 is inserted.

As illustrated in FIGS. 15 to 17, the shafts 51b extend along the rotational axis Ax2. The shafts 51b are spaced apart from each other around the sun gear 50, and supported by the plate 51a.

Figure 19:
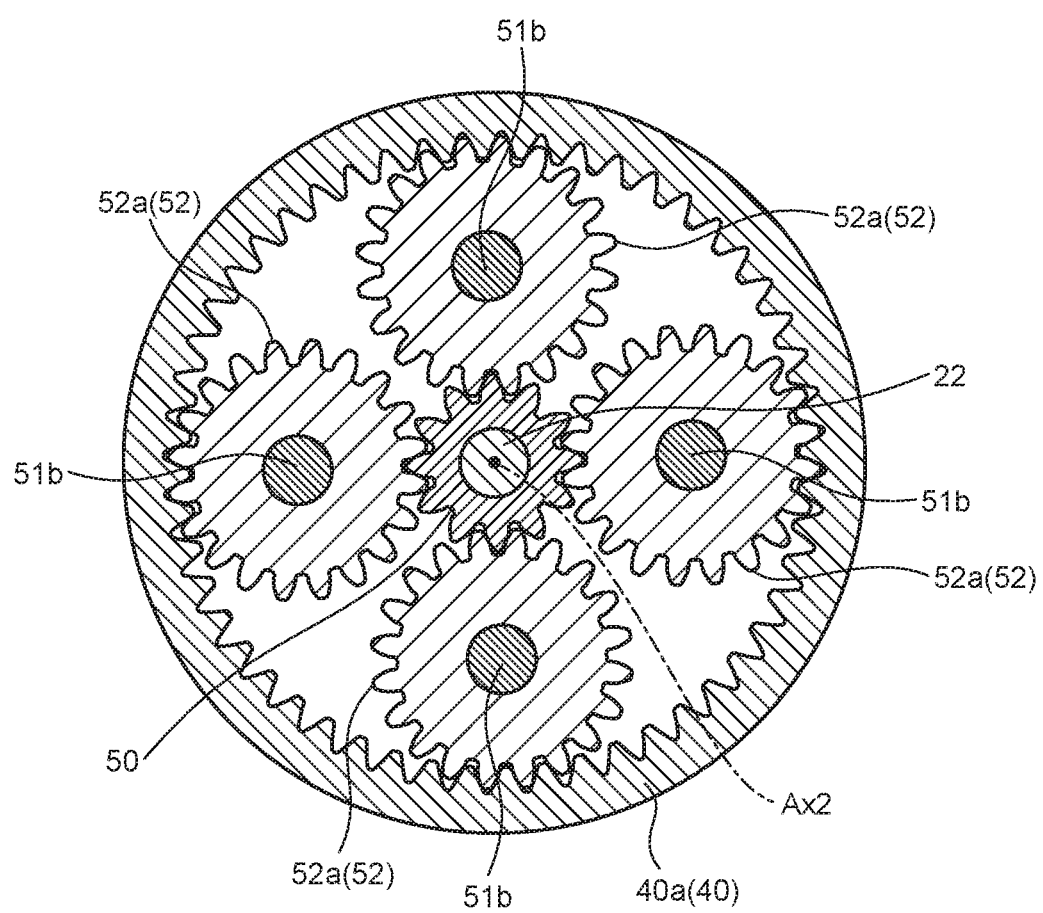
FIG. 19 is a cross-sectional view taken along line XIX-XIX in FIG. 18.
Figure 20:
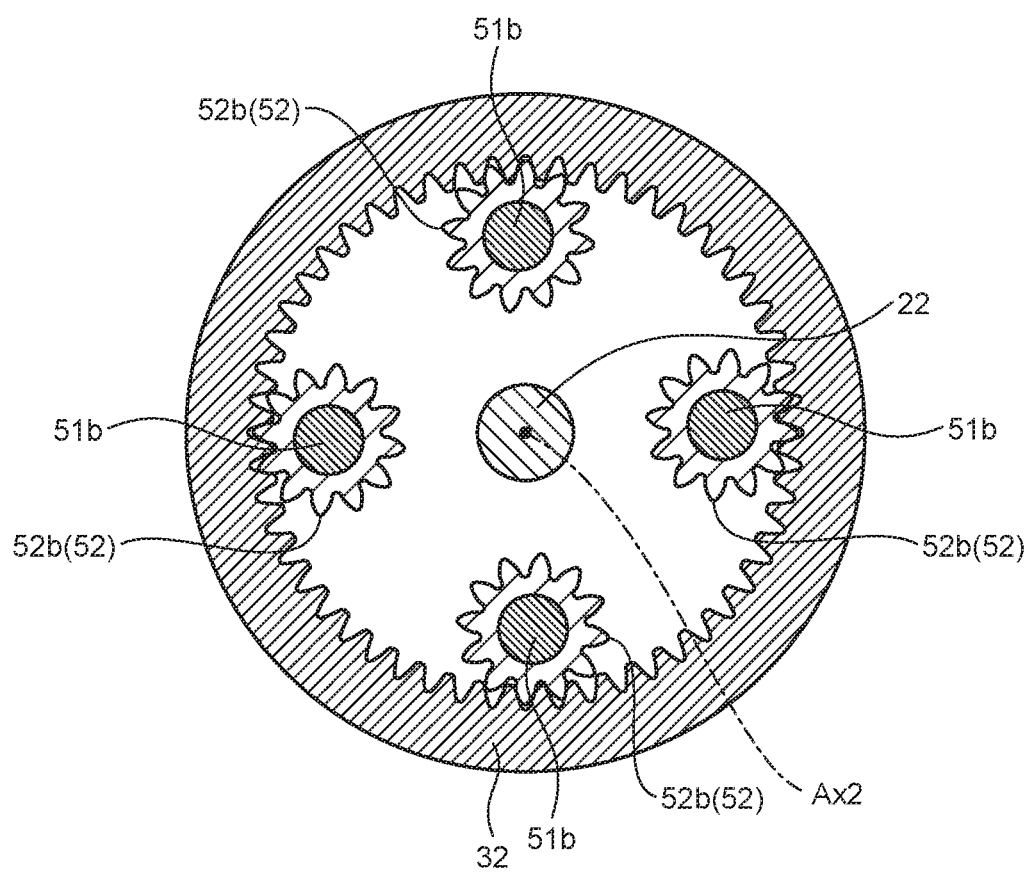
FIG. 20 is a cross-sectional view taken along line XX-XX in FIG. 18.
Figure 21:
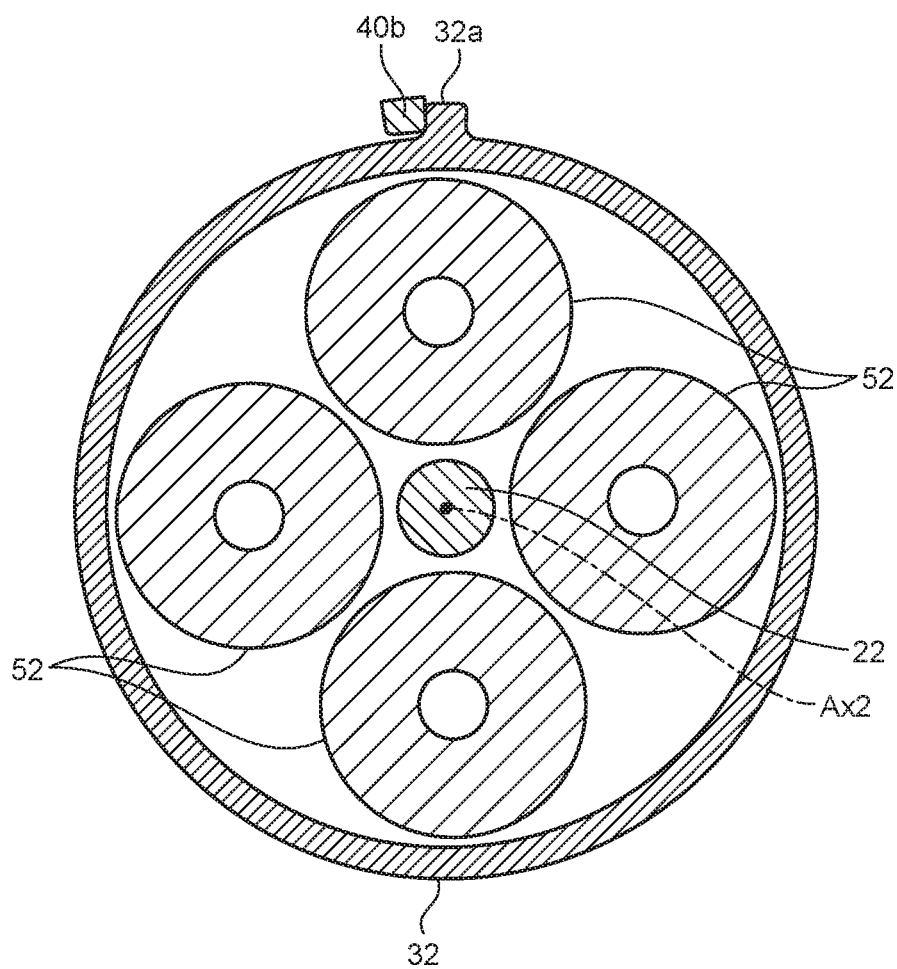
FIG. 21 is a cross-sectional view taken along line XXI-XXI in FIG. 18.

FIG. 19 is a cross-sectional view taken along line XIX-XIX in FIG. 18. FIG. 20 is a cross-sectional view taken along line XX-XX in FIG. 18. FIG. 21 is a cross-sectional view taken along line XXI-XXI in FIG. 18. As illustrated in FIGS. 19 to 21, the planetary gears 52 are supported by the shafts 51b and spaced apart from each other about the sun gear 50 (rotational axis Ax2). The planetary gears 52 are supported by the shafts 51b rotatably about the center of the shafts 51b. As illustrated in FIGS. 15, 19, and 20, each planetary gear 52 includes an external gear 52a to engage with the sun gear 50 and an external gear 52b to engage with the internal gear 32. The external gears 52a and 52b of the planetary gears 52 are exemplary gears, and the internal gear 32 is an exemplary second gear.

In the deceleration unit 24A as configured above, along with the rotation of the sun gear 50 about the rotational axis Ax2, following the rotation of the worm wheel 29, the planetary gears 52 rotate about the center of the shafts 51b. Thereby, the internal gear 32 engaged with the external gears 52a of the planetary gears 52 rotates. The internal gear 32 rotates at a reduced speed with respect to the worm wheel 29. The output shaft 22 coupled to the internal gear 32 and the pinion 4 of the output shaft 22 rotate together with the internal gear 32.

As illustrated in FIGS. 16 and 19, the external gear 52a of each planetary gear 52 is also engaged with the internal gear 40a of the stopper member 40. Thus, along with the rotation of the worm wheel 29, the sun gear 50 rotates and the planetary gears 52 rotate about the center of the shaft 51b, and then the internal gear 40a (stopper member 40) rotates about the rotational axis Ax2.

As illustrated in FIGS. 15 and 21, in the present embodiment, the stopper 25A includes a first contact 32a and a second contact 40b.

In the present embodiment, as with the first embodiment, the stopper member 40 and the internal gear 32 rotate in different manners. Specifically, the stopper member 40 and the internal gear 32 rotate in the same direction but at different rotation speeds. Either of the stopper member 40 and the internal gear 32 may rotate at a higher speed. The rotation speeds are appropriately set depending on the numbers of the respective teeth of the internal gear 40a of the stopper member 40, the external gear 52a, the internal gear 32, and the external gear 52b. In the present embodiment with such a configuration, as with the first embodiment, when the first contact 32a and the second contact 40b rotate about the rotational axis Ax2 in one direction, the faster contact catches up with the slower contact, abutting against each other in the circumferential direction of the rotational axis Ax2. This places the forces of the gears (internal gear 40a, external gear 52a, internal gear 32, external gear 52b) in a balanced state, stopping the gears (first stop state). When the first contact 32a and the second contact 40b rotate in the opposite direction along the rotational axis Ax2 (reverse rotation) from the first stop state, the faster contact catches up with the slower contact, abutting against each other in the circumferential direction of the rotational axis Ax2 to stop the gears (second stop state).

In the present embodiment, for example, a gear may be interposed between the planetary gears 52 and the internal gear 40a or the internal gear 32 to be able to rotate the stopper member 40 and the internal gear 32 in opposite directions.

While certain embodiments of the present invention have been illustrated as above, the above embodiments are merely exemplary and are not intended to limit the scope of the invention. The above embodiments can be implemented in other various forms, and omission, replacement, and change can be made as appropriate without departing from the spirit of the invention. Specifications (such as structures, types, directions, size, length, width, thickness, height, number, arrangement, position, and material) including the configurations and shapes can be appropriately changed for implementation.

The invention claimed is:

1. A deceleration device, comprising:
   a first deceleration unit comprising a worm configured to rotate by driving power of a drive mechanism and a driven gear configured to engage with the worm and to rotate about a rotational axis by the driving power of the drive mechanism;
   a second deceleration unit comprising a plurality of gears including a first gear and a second gear, the first gear that rotates by the driven gear, the second gear that rotates about the rotational axis, the second deceleration unit configured to rotate the second gear at a reduced speed with respect to the driven gear;
   a first contact included in the second gear;
   a second contact provided separately from the driven gear and the plurality of gears and configured to come into contact with the first contact to stop the rotation of the second gear;
   a third gear configured to rotate by the driving power transmitted through the driven gear; and
   a stopper member to which the driving power is transmitted from the third gear, the stopper member configured to rotate about the rotational axis, wherein
   the second contact is included in the stopper member.

2. The deceleration device according to claim 1, wherein
the stopper member and the second gear rotate in the same direction, and
the stopper member and the second gear rotate at different speeds.

3. The deceleration device according to claim 1, wherein the stopper member is rotated by the third gear at a reduced speed with respect to the driven gear.

4. The deceleration device according to claim 1, further comprising
a rotational element including both the first gear and the third gear.

5. The deceleration device according to claim 4, wherein teeth of the first gear are thicker in thickness than teeth of the third gear along the rotational axis.

6. A deceleration device, comprising:
a driven gear configured to rotate about a rotational axis by driving power of a drive mechanism;
a deceleration unit comprising a plurality of gears including a first gear and a second gear, the first gear that rotates by the driven gear, the second gear that rotates about the rotational axis, the deceleration unit configured to rotate the second gear at a reduced speed with respect to the driven gear;
a first contact included in the second gear;
a second contact provided separately from the driven gear and the plurality of gears and configured to come into contact with the first contact to stop the rotation of the second gear;
a third gear configured to rotate by the driving power transmitted through the driven gear; and
a stopper member to which the driving power is transmitted from the third gear, the stopper member configured to rotate about the rotational axis, wherein
the second contact is included in the stopper member.

7. The deceleration device according to claim 6, wherein
the stopper member and the second gear rotate in the same direction, and
the stopper member and the second gear rotate at different speeds.

8. The deceleration device according to claim 6, wherein the stopper member is rotated by the third gear at a reduced speed with respect to the driven gear.

9. The deceleration device according to claim 6, further comprising
a rotational element including both the first gear and the third gear.

10. The deceleration device according to claim 9, wherein teeth of the first gear are thicker in thickness than teeth of the third gear along the rotational axis.

* * * * *